INVENTOR:
ROBERT B. DOME,
BY Donald N. Timbie
HIS ATTORNEY.

INVENTOR:
ROBERT B. DOME,
BY Donald N. Tinkle
HIS ATTORNEY.

United States Patent Office 2,951,900

Patented Sept. 6, 1960

2,951,900

AUTOMATIC GAIN CONTROL CIRCUIT

Robert B. Dome, Geddes Township, Onondaga County, N.Y., assignor to General Electric Company, a corporation of New York Filed Aug. 6, 1958, Ser. No. 753,450

14 Claims. (Cl. 178—7.3)

My invention relates to automatic gain control (AGC) circuits for television receivers or the like, and more particularly to automatic gain control circuits effective to prevent receiver overload during the reception of very strong signals.

It is well known in the television art to employ, as an economical expedient, AGC circuits which apply the average value of the detected video signal to stages preceding the video detector; however, the control potential thus developed is generally insufficient to prevent receiver overload during the reception of very strong signals such as may be encountered in prime service areas.

To furnish sufficient AGC potential to prevent such receiver overload, the average value of the detected video signal could be amplified before being applied to stages preceding the video detector. Direct current amplification of the AGC signal has heretofore been employed; however, it is well known that conventional direct current amplifiers are extremely sensitive to slight circuit parameter variations and therefore, require frequent adjustment to maintain them in balance.

Another circuit for producing an AGC voltage of sufficient amplitude employs the direct current component of the second detector to control the efficiency of a grid-controlled rectifier. The voltage to be rectified may be any suitable alternating current activating potential such as the flyback pulses produced in the horizontal deflection system, the rectified output being the desired AGC voltage. Such a circuit has been called an alternating current amplification AGC circuit. One of the difficulties experienced with this circuit is that the AGC voltage varies with changes in amplitude of the alternating current potential. This can be overcome by using a pentode as the controlled rectifier, but tubes of this type are expensive.

Keyed AGC systems have been used in which the video signal, not just its D.C. component, is applied to an amplifier that is activated by the application of alternating current potential in the form of pulses occurring during the synchronizing pulse or blanking periods. Here also an expensive pentode amplifier has been used in order to provide an AGC voltage that is independent of the amplitude of the activating pulses.

In each of the last two circuits an expensive pentode may be used to minimize the variation of the AGC voltage produced by the amplitude variation of the activating alternating current potentials.

Accordingly, it is a general object of this invention to provide in an AGC circuit using alternating current activation a means for minimizing the effects of amplitude variations in the activation potential on the AGC voltage developed.

It is an object of this invention to provide a relatively inexpensive means for compensating for the variation in the amplitude of the alternating current potential in an alternating current amplification AGC circuit.

It is another object of this invention to provide a relatively inexpensive means of compensating for variations in the amplitude of the activating pulses used in a keyed AGC system.

In general these objectives are attained in accordance with this invention by separately rectifying the alternating current activating potential and applying the signal thus derived to the amplifier in such manner as to provide compensation.

Further objects and features of my invention will become apparent from a consideration of the following description when taken in connection with the accompanying drawings; and the features of novelty of my invention are set forth with particularity in the appended claims.

In practicing my invention a superheterodyne television receiver or the like of conventional design is provided including an RF amplifier stage, a first detector or mixer stage, a plurality of intermediate frequency amplifier stages, a video or second detector stage, and a horizontal and vertical scanning system maintained in synchronization by synchronizing pulses contained in the incoming composite video signal.

Figure 1:
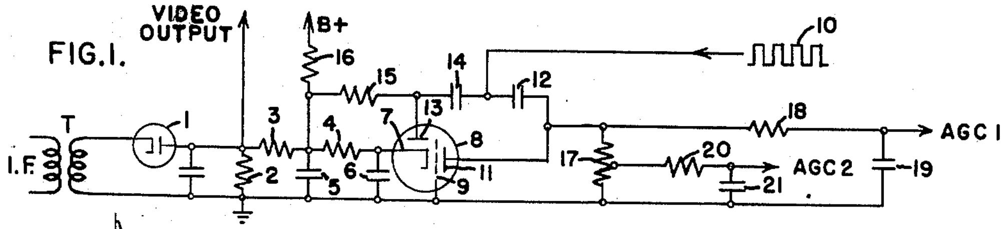
Figure 1 illustrates an AGC system incorporating one embodiment of my invention.

In Figure 1 diode 1, inductively coupled to the last intermediate frequency stage by transformer T, detects the composite video signal. The detected video signal develops a video voltage across load resistor 2. The D.C. component of this video voltage is obtained by a low pass filter comprising resistors 3 and 4 and capacitors 5 and 6. The D.C. component of the video voltage, the output of the low pass filter, is applied to cathode 7 of AGC amplifier tube 8, which is shown as a triode. Grid 9 of AGC amplifier tube 8 is grounded and a suitable source 10 of high A.C. excitation voltage is applied to plate 11 through capacitor 12. The source 10 of A.C. excitation voltage could be horizontal flyback pulses obtainable in the horizontal scanning system of the receiver.

In order to compensate for any variations in magnitude of the A.C. excitation voltage from source 10, a compensating bias is applied to cathode 7 of AGC amplifier tube 8. This compensating bias is provided by rectifying the A.C. voltage pulses from source 10 by a diode herein shown by way of example as having common cathode 7 and plate 13 contained within the same envelope as AGC amplifier tube 8. A.C. voltage pulses from source 10 are capacitively coupled through capacitor 14 to the diode plate 13. The bias diode load comprises resistors 4 and 15 in series. Resistors 4 and 15 form a voltage divider so that only that portion of the rectified voltage appearing across resistor 4 is applied to cathode 7 as bias.

The direction of the electron flow due to the rectified pulses through resistor 4 will be from the junction of resistors 3 and 4 to cathode 7, so that a positive potential will be applied to cathode 7 of AGC amplifier tube 8. In operation, as the pulses from source 10 increase in magnitude, the tendency would be for the output of AGC amplifier tube 8 also to increase. However, the positive rectified potential appearing at cathode 7 will also increase as the A.C. pulses from source 10 increase, which will cause an increase of the negative bias on amplifier tube 8 since grid 9 is grounded, and result in a compensating action for the increase in pulse magnitude of source 10. This same compensating action operates in reverse when the magnitude of the pulses from source 10 decreases.

The amount of rectified bias potential applied to cathode 7 is determined by the ratio of the resistances of resistor 15 to resistor 4. I have found that optimum compensating action, when the A.C. excitation voltage exceeds a predetermined amount, say 40 volts, is obtained when the following relation is established:

$$\frac{\text{Resistor 15}}{\text{Resistor 4}} \cong \mu$$

where $\mu$ equals the amplification factor for amplifier tube 8. Good results will be obtained for values not quite meeting this condition, but if this relation is held within ±20% very effective compensation against changes in AGC potential due to amplitude variations in the pulses from source 10 is obtained.

This may be illustrated by selecting a specific example. Let the tube be a 6AV6 duo-diode triode. The $\mu$ is about 95 for this tube under the low current conditions wherein it will be used. Thus if the value of resistor 15 is 1.5 megohms, $$\text{resistor } 4 = \frac{1.5 \times 10^6}{95} = 16{,}000 \text{ ohms}$$

Figures 2, 3:
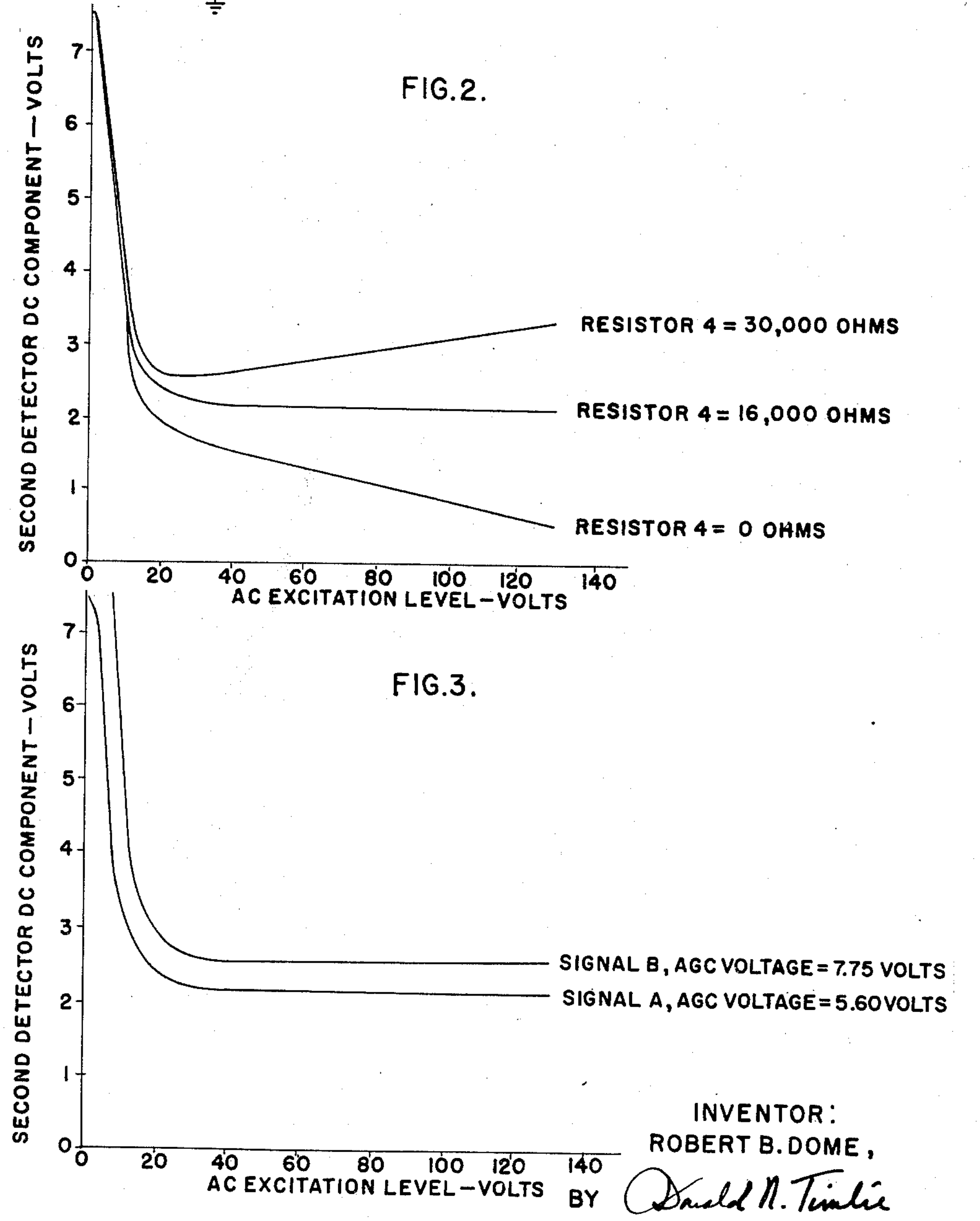
Figure 2 illustrates the operation of the system of Figure 1 when varying a circuit parameter.
Figure 3 illustrates the operation of the AGC system at two different signal input levels.

This compensating action is clearly shown in Figure 2 in which the D.C. component output of the second detector is plotted against the A.C. excitation level for three different values of resistor 4. In Figure 2 it is seen that when resistor 4 is less than the computed value of 16,000 ohms, the AGC potential acts so as to decrease the second detector D.C. component as the A.C. excitation level increases from 40 to 130 volts. When resistor 4 is greater than 16,000 ohms, the AGC potential acts so as to increase the second detector D.C. component as the A.C. excitation level is increased from 40 to 130 volts. However, it is seen that when resistor 4 is chosen to equal 16,000 ohms so that the ratio of resistor 15 to resistor 4 equals $\mu$, the second detector D.C. component output remains independent of the A.C. excitation level as it is varied from 40 to 130 volts.

In order that the second detector level may be established at a desired point, I provide an additional bias for delay. In Figure 1 this delay bias is furnished by bleeding current from the B+ voltage supply through resistor 16 which is connected to the junction of resistors 3 and 4 or alternatively to cathode 7 of AGC amplifier tube 8. I found that when the value of resistor 16 is 15 megohms and the value of resistor 3 is 110,000 ohms while the value of load resistor 2 is 3,000 ohms, the bias developed across resistor 3 maintained the second detector level in the range between two and three volts D.C.

Resistor 17 is the load resistance for plate 11 of AGC amplifier tube 8. Different levels of AGC control potential can be obtained by varying the tapping point on resistor 17. In Figure 1 two levels of AGC potential are shown. The higher level, AGC 1, is obtained by taking the output of AGC amplifier tube 8 from the plate end of resistor 17 and filtering this output by means of the filter network shown as resistor 18 and capacitor 19. The lower level, AGC 2, is obtained by taking the output of AGC amplifier tube 8 from a tapped point on resistor 17 and filtering this output by means of a second filter network shown as resistor 20 and capacitor 21. The filter output of AGC amplifier tube 8 is applied as AGC potential to stages preceding the second video detector.

Figure 3 illustrates the performance of the AGC system of Figure 1 on the reception of two different input signal levels. This graph is a plot of the second detector D.C. component output as the A.C. excitation level is varied for two separate signal input levels. Signal A produced an AGC potential of 5.60 volts and signal B produced an AGC potential of 7.75 volts while the second detector D.C. component output for these two signal levels varied only from 2.18 volts up to 2.62 volts, indicating that the gain of the AGC amplifier is:

$$\text{Gain} = \frac{7.75 - 5.60}{2.62 - 2.18} = \frac{2.15}{0.44} = 4.9$$

This gain indicates that the second detector level is flatter by a factor 4.9 times over that which no amplification would provide. The amplification could be increased still further by reducing the value of resistor 3, but resistor 3 should not be reduced to a value so low that serious shunting of the diode load resistor 2 would result. Accordingly, I prefer to keep the value of resistor 3 at least 10 times the value of resistor 2, so while I used 110,000 ohms for resistor 3, when resistor 2 was 3,000 ohms in the above example, resistor 3 could be reduced to approximately 30,000 ohms. Resistor 16 would then have to be correspondingly reduced in order to maintain the same delay as previously discussed.

Figure 4:
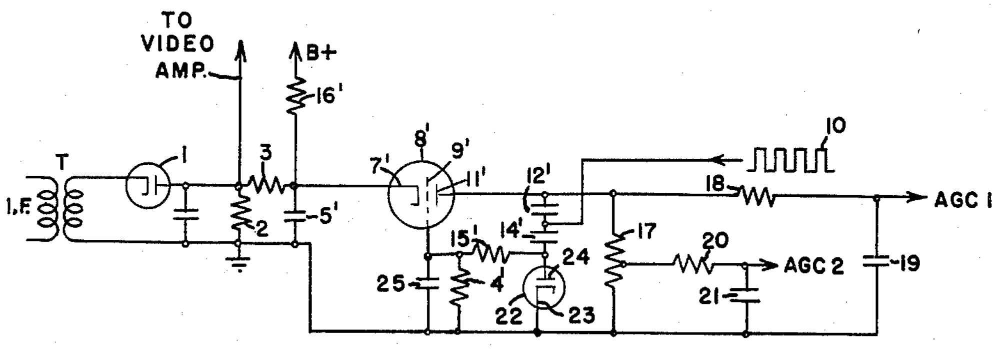
Figure 4 illustrates a second embodiment of my invention.

Figure 4 illustrates a modification of Figure 1 when a separate diode 22 having cathode 23 and plate 24 is available elsewhere in the receiver and not within the common envelope of AGC amplifier tube 8'. In this embodiment amplifier tube 8' could be a single triode contained in one envelope or one triode of a pair of triodes contained within a single envelope. Separate diode 22 now performs the same function of establishing a bias potential which compensates for varying amplitude of the alternating current excitation voltage as was previously performed, in the embodiment depicted in Figure 1, by the diode contained within the same envelope as AGC amplifier tube 8. Resistors 4' and 15' are diode 22 load resistors, and functionally correspond respectively to resistors 4 and 15 of Figure 1. The junction of resistors 4' and 15' is connected to grid 9' of AGC amplifier tube 8' so that the compensating bias is applied as a negative potential to the grid of the AGC amplifier tube rather than as a positive potential to the cathode as is done in Figure 1. Similar in operation to the circuit depicted in Figure 1, the rectified A.C. voltage is divided by resistors 4' and 15' so that only that portion of the rectified A.C. voltage appearing across resistor 4' is applied to grid 9' of AGC amplifier tube 8' as rectified compensating bias. As in Figure 1, optimum compensation is obtained when the ratio of the resistances of the diode load resistors, now the ratio of the resistances of resistor 15' to 4', approximates the amplification factor of AGC amplifier tube 8'.

In the arrangement of Figure 4 resistor 4' is by-passed by capacitor 25 so that grid 9' is at A.C. ground potential and, therefore, not influenced by the A.C. excitation voltage by capacitive coupling with plate 11' within the tube. Cathode 7' is by-passed to ground by capacitor 5', so that the rectified pulses of AGC amplifier tube 8' are not fed back to the video detector load resistor 2, since their presence there would be carried onto the picture tube and might interfere with the picture presentation.

Figure 5:
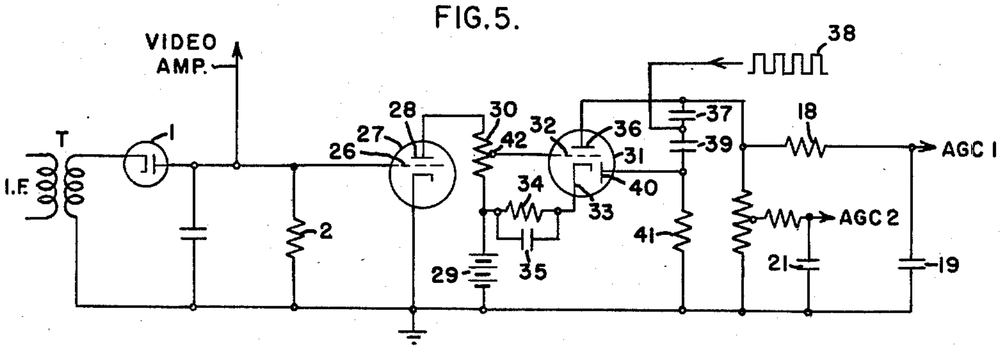
Figure 5 illustrates a third embodiment of my invention.

Figure 5 illustrates the application of my invention to a keyed AGC system. The composite detected video voltage appearing across detector load resistor 2 is directly coupled to grid 26 of amplifier tube 27. Anode 28 of amplifier tube 27 is connected to a source of B+ voltage 29 through load resistor 30. Amplifier tube 27 could be either the first video amplifier tube for the picture tube chain or the synchronization pulse amplifier tube.

Tube 31 is a combination triode keyer and a diode for rectifying the A.C. excitation voltage for obtaining the compensating bias of my invention. Grid 32 of the keyer triode section of tube 31 is connected to amplifier tube 27 plate load resistor 30 at either the plate end or tapped somewhere along it. Cathode 33 of the keyer triode is connected through resistor 34 to the same source of B+ voltage 29 as is used for amplifier tube 27. Resistor 34 is by-passed by capacitor 35. The keyer excitation voltage is obtained by coupling plate 36 of tube 31 through capacitor 37 to a source 38 of horizontal flyback pulses derived in the horizontal scanning system of the receiver.

Source 38 of horizontal flyback pulses is also coupled through capacitor 39 to plate 40 of the compensating diode comprising common cathode 33 and plate 40. The compensating diode load comprises resistors 34 and 41 in series. As described when discussing Figures 1 and 4, compensation is again achieved when the ratio of the resistances of the diode load resistors, now the ratio of the resistances of resistor 41 to resistor 34, approximates the amplification factor of the keyer section of tube 31.

The keying action is as follows: The amplitude of the flyback pulses 38 must exceed the B+ voltage source 29 before any AGC bias can be developed, since the B+ voltage source 29 acts as a cut-off bias on the voltage between plate 36 and cathode 33 of the keyer section of tube 31. This cut-off bias furnished by B+ voltage source 29 should be of sufficient value so that the keyer section of tube 31 only conducts during the synchonizing time interval, in order that only the synchronizing pulses contained in the composite detected video signal are amplified as AGC potential. In this way the keyer section of tube 31 will be cut off during the time interval between synchronizing pulses, and therefore any noise pulses occurring between sync pulses will not affect the AGC potential. Since compensating diode load resistor 41 is returned to ground, B+ source voltage 29 is also included in the diode load circuit. Thus the triode plate 36 and diode plate 40 are supplied with the same kind of composite voltages—partly A.C. and partly D.C.

Delay in the AGC can be varied by changing the tap position 42 along resistor 30. The AGC delay could be increased by bleeding a D.C. voltage from a D.C. voltage source higher than 29 through an additional resistance connected to cathode 33 of tube 31. To obtain less AGC delay one of the following could be done: Cathode 33 of tube 31 could be connected through a resistance to ground; resistor 34 could be tapped down on B+ source voltage 29; or resistor 30 could be connected to a higher B+ source than voltage 29.

If a separate diode is available in the receiver, an arrangement similar to that shown in Figure 4 could be used, the only difference being that the output of the separate diode rectifier would be applied to the cathode 33 instead of the grid.

On the foregoing it may be seen that my invention provides a simple, economical, and effective type of AGC system which provides an amplified AGC potential of sufficient magnitude to prevent receiver overload during the reception of very strong signals and which remains substantially independent of variations in the magnitude of the A.C. excitation voltage applied to the AGC amplifier over an extended range of excitation voltages.

Although certain embodiments of my invention have been described which are illustrative thereof, it is obvious that various modifications and changes can be made therein without departing from the intended scope of my invention as defined in the appended claims.

What I claim as new and desire to secure by Letters Patent of the United States is:

1. In a television receiver adapted to receive and demodulate a composite video signal, an automatic gain control system comprising a source of alternating current voltage, an amplifier having at least a plate, a grid and a cathode, a load resistor for said amplifier coupled in a direct current path between said plate and said cathode, means for direct current coupling the demodulated composite video signal between the grid and cathode of said amplifier, means for applying said alternating current voltage to the plate of said amplifier, a diode and a load circuit therefor alternating current coupled to said source for rectifying the said alternating current voltage, and means for minimizing variations in the output of said amplifier as a result of variations in magnitude of said alternating current voltage comprising means for applying at least a portion of said rectified alternating current voltage directly between said cathode and said grid.

2. An automatic gain control system as in claim 1 wherein said load circuit comprises first and second resistances which are connected in series and means for applying between said cathode and grid only that portion of said rectified alternating current voltage appearing across said second resistance.

3. An automatic gain control system as in claim 2 wherein the ratio of said first resistance to said second resistance is substantially equal to the amplification factor of said amplifier.

4. An automatic gain control system as in claim 1 wherein said diode comprises said cathode of said amplifier and an additional plate.

5. An automatic gain control system as in claim 1 including means for applying a fixed direct current delay voltage to said amplifier for maintaining said amplifier unresponsive to said demodulated video signal until said video signal exceeds a predetermined amplitude.

6. An automatic gain control system as in claim 1 wherein said alternating current voltage comprises flyback pulses derived in the horizontal scanning system of the said receiver.

7. An automatic gain control system as in claim 6 wherein in addition to said flyback pulses a fixed direct current voltage is applied to said amplifier to maintain said amplifier nonconductive during the interval between synchronizing pulses and conductive only during the interval of the synchronizing pulses.

8. An automatic gain control circuit comprising an amplifier having an output electrode and two control electrodes, a source of an alternating current potential, a capacitor coupled between said source and said output electrode, a load circuit coupled to said output electrode for developing an automatic gain control voltage, means for applying at least a portion of a received signal between said control electrodes, a rectifier having an input and an output, a second capacitor coupling the input of rectifier to said source of alternating current potential, and means for applying at least a portion of the output of said rectifier between said control electrodes as a bias of such polarity as to reduce the energy flow through said output electrode.

9. An automatic gain control circuit as set forth in claim 8 in which means are provided for applying a portion of the output of said rectifier as a bias between said control electrodes, said portion being approximately equal to $1/\mu$ where $\mu$ is the amplification factor of the amplifier.

10. A keyed automatic gain control circuit comprising a source of video signals having blanking portions, an amplifier having an anode, a control grid and a cathode, means for coupling said video signals to said control grid and said cathode in such polarity that said blanking portions tend to increase the electron flow in said amplifier, a source of pulses occurring during the said blanking portions of said video signal, a first capacitor coupled between said source and said anode so as to couple said pulses thereto, a rectifier, a second capacitor coupled between said source of pulses and said rectifier so as to apply said pulses thereto, and means for applying at least a portion of the output of said rectifier directly between said control grid and cathode as a bias of such polarity as to tend to reduce the electron flow to said anode.

11. A keyed automatic gain control circuit comprising a first amplifier having an anode, a control grid and a cathode, a ground connection for said cathode, a source of potential having positive and negative terminals, means for connecting said negative terminal to ground, a resistor connected between said positive terminal and said anode, a second amplifier having an anode, a control grid and a cathode, a connection between said latter grid and a point on said resistor, a second resistor connected between said positive terminal of said source of potential and said latter cathode, a capacitor connected in parallel with said second resistor, a source of pulses of a predetermined repetition rate, a capacitor connected between said source of pulses and said latter anode, a load resistor connected between said latter anode and ground, said second amplifier also having a diode plate, a capacitor connected between said source of pulses and said diode plate, a third resistor connected between said diode plate and ground.

12. A keyed automatic gain control circuit as set forth in claim 11 wherein the ratio of the resistances of said third and second resistors respectively is approximately equal to the amplification factor of said second amplifier.

13. An alternating current amplification automatic gain control circuit in which the effect of variation in amplitude of the alternating current excitation voltage on the automatic gain control voltage may be minimized comprising a source of detected television video signals which have synchronizing and blanking components of greater amplitude than the remainder of the signal and which extend beyond the rest of the signal in a given polarity, said source having a grounded terminal and an ungrounded terminal at which said video signal appears with its synchronizing and blanking components extending in a negative direction, a load resistor for said source connected between said terminals, a triode amplifier having a cathode, grid, plate, and an auxiliary plate operating in conjunction with said cathode to form a diode, means for grounding said grid, first and second resistors connected in series between said ungrounded terminal of said source and said cathode, a first capacitor connected between the junction of said first and second resistors and ground, a second capacitor connected between said cathode and ground, said first and second resistors and said first and second capacitors forming a low pass filter whereby the voltage applied to said cathode is the direct current component of the video signal, a source of positive potential, a third resistor connected between said latter source and the junction of said first and second resistors, a fourth resistor connected between said auxiliary plate and said junction of said first and second resistors, a source of alternating current voltage, a third capacitor connected between said latter source and said auxiliary plate whereby said alternating current voltage is rectified by said auxiliary plate, said cathode, said second resistor and said fourth resistor and the portion of the rectified voltage appearing across said second resistor biases said cathode with respect to said grid, a fourth capacitor connected between said source of alternating current potential and said plate of said amplifier, and an output resistor connected between said plate of said amplifier and ground.

14. An alternating current amplification automatic gain control circuit in which the effect of variation in amplitude of the alternating current excitation voltage on the automatic gain control voltage may be minimized comprising a source of detected television video signals which have synchronizing and blanking components of greater amplitude than the remainder of the signal and which extend beyond the rest of the signal in a given polarity, said source having a grounded terminal and an ungrounded terminal at which said video signal appears with its synchronizing and blanking components extending in a negative direction, a load resistor for said source connected between said terminals, a triode amplifier having a cathode, grid, and plate, a first resistor connected between said ungrounded terminal of said source of video signals and said cathode, a first capacitor connected between said cathode and ground, said first resistor and first capacitor comprising a low pass filter whereby the direct current component of the video signal is applied to said cathode, a source of positive potential, a second resistor connected between said latter source and said cathode, a second capacitor and a third resistor connected in parallel between said grid and ground, third and fourth capacitors and a diode having a plate and a cathode connected in series in the order named between said plate and ground, said cathode of said diode being connected to ground, a fourth resistor connected between said grid of said amplifier and said plate of said diode, a source of alternating current voltage, a connection between said source and the junction of said third and fourth capacitors, and a load resistor connected between said plate of said triode amplifier and ground.

References Cited in the file of this patent

UNITED STATES PATENTS 2,854,507 Berkhout ______________ Sept. 30, 1958